United States Patent
Masuda et al.

(10) Patent No.: US 10,609,027 B2
(45) Date of Patent: Mar. 31, 2020

(54) COMMUNICATION SYSTEM, COMMUNICATION METHOD, AND MANAGEMENT DEVICE

(71) Applicant: Panasonic Intellectual Property Management Co., Ltd., Osaka (JP)

(72) Inventors: Yoichi Masuda, Tokyo (JP); Tomoki Takazoe, Kanagawa (JP); Manabu Maeda, Osaka (JP); Yuji Unagami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 232 days.

(21) Appl. No.: 15/322,279

(22) PCT Filed: May 27, 2015

(86) PCT No.: PCT/JP2015/002676
§ 371 (c)(1),
(2) Date: Dec. 27, 2016

(87) PCT Pub. No.: WO2016/002129
PCT Pub. Date: Jan. 7, 2016

(65) Prior Publication Data
US 2017/0142104 A1    May 18, 2017

(30) Foreign Application Priority Data

Jun. 30, 2014 (JP) .................... 2014-134289

(51) Int. Cl.
*H04L 29/06* (2006.01)
*G06F 21/44* (2013.01)
(Continued)

(52) U.S. Cl.
CPC ........ *H04L 63/0869* (2013.01); *G06F 21/305* (2013.01); *G06F 21/44* (2013.01);
(Continued)

(58) Field of Classification Search
CPC .................................................. H04L 63/0869
See application file for complete search history.

(56) References Cited

U.S. PATENT DOCUMENTS 6,215,877 B1    4/2001 Matsumoto
2005/0055552 A1    3/2005 Shigeeda
(Continued)

FOREIGN PATENT DOCUMENTS

EP    1753171 A1 *    2/2007    .......... H04L 43/0811
JP    05067286 A *    3/1993
(Continued)

OTHER PUBLICATIONS

Office Action for corresponding Japanese Patent Application No. 2014-134289 dated Apr. 10, 2018.
(Continued)

*Primary Examiner* — Shawnchoy Rahman
(74) *Attorney, Agent, or Firm* — Renner, Otto, Boisselle & Sklar, LLP (57) ABSTRACT

A communication system, including: a NW management device which (i) forms a network together with an authenticated target device, and (ii) manages the network by delivering a session key for use in communication in the network to the authenticated target device; and a device authenticated by the NW management device, wherein the NW management device: determines whether or not to permit the device to be an alternative management device which manages the network in replace of the NW management device when communication is impossible in the network; shares, with the device, authentication information about the authenticated target device, when permitting the device to be the alternative management device; and the device shares the authentication information with the NW management device, and starts managing the network using the authentication information as the alternative management device when determining that the NW management device cannot communicate in the network.

10 Claims, 9 Drawing Sheets

(51) Int. Cl.
*G06F 21/30* (2013.01)
*H04L 9/32* (2006.01)
*H04L 9/08* (2006.01)
*H04L 29/08* (2006.01)

(52) U.S. Cl.
CPC ............ *H04L 9/083* (2013.01); *H04L 9/0891* (2013.01); *H04L 9/3273* (2013.01); *H04L 67/146* (2013.01); *H04L 63/0823* (2013.01)

(56) References Cited

U.S. PATENT DOCUMENTS

| | | | | |
|---|---|---|---|---|
| 2008/0184338 | A2* | 7/2008 | McCreight | G06F 21/606 726/3 |
| 2009/0248842 | A1* | 10/2009 | Hashimoto | H04L 41/0893 709/221 |
| 2013/0212440 | A1* | 8/2013 | Rom | G06F 11/0709 714/47.1 |
| 2015/0165321 | A1* | 6/2015 | Mizuguchi | A63F 13/12 463/31 |

FOREIGN PATENT DOCUMENTS

| | | |
|---|---|---|
| JP | 10-051438 | 2/1998 |
| JP | 10327165 A * | 12/1998 |
| JP | 11-275068 | 10/1999 |
| JP | 2004-135195 | 4/2004 |
| JP | 2005085102 A | 3/2005 |
| JP | 2007226390 A * | 9/2007 |
| JP | 2013013625 A * | 1/2013 |

OTHER PUBLICATIONS

International Search Report for corresponding International Application No. PCT/JP2015/002676 dated Aug. 4, 2015.
Form PCT/ISA/237 for corresponding International Application No. PCT/JP2015/002676 dated Aug. 4, 2015.

* cited by examiner

COMMUNICATION SYSTEM, COMMUNICATION METHOD, AND MANAGEMENT DEVICE

TECHNICAL FIELD

The present invention relates to a communication system, a communication method, and a management device for managing a network.

BACKGROUND ART

Home energy management systems (HEMSs) for supporting energy management in houses using controllers (network management devices) have been known. The management includes optimum running of household electrical devices, displaying an electricity generating state or an electricity using state in real time, etc.

Other techniques which have been known include a technique for managing a network by allowing mutual authentication between a management device and devices using electronic certificates or the like and delivering of session keys (see Patent Literature 1).

CITATION LIST

Patent Literature

PTL1: Japanese Unexamined Patent Application Publication No. 2004-135195

SUMMARY OF THE INVENTION

Technical Problem

When a plurality of management devices are present in the same network, one of them is determined to be a management device which manages the network. However, if the management device which manages the network cannot communicate due to a breakdown or the like, authentication or update of session keys is not performed, which hampers continuous operation of the system.

The present invention was made in view of the above problem, and has an object to provide a communication system, a communication method, and a management device for increasing the stability of the system.

Solutions to Problem

In order to achieve the above object, a first aspect of the present invention is a communication system, including: a management device which (i) forms a network together with an authenticated target device, and (ii) manages the network by delivering a session key for use in communication in the network to the authenticated target device; and a device authenticated by the management device, wherein the management device: determines whether or not to permit the device to be an alternative management device which manages the network in replace of the management device when communication is impossible in the network; shares, with the device, authentication information about the authenticated target device, when permitting the device to be the alternative management device; and the device shares authentication information with the management device, and starts managing the network using the authentication information as the alternative management device when determining that the management device cannot communicate in the network.

A second aspect of the present invention is a communication method performed in a communication system including: a management device which (i) forms a network together with an authenticated target device, and (ii) manages the network by delivering a session key for use in communication in the network to the authenticated target device; and a device authenticated by the management device, the communication method including: determining whether or not to permit the device to be an alternative management device which manages the network in replace of the management device when communication is impossible in the network, the determining being performed by the management device; sharing, with the device, authentication information about the authenticated target device, when permitting the device to be the alternative management device, the sharing being performed by the management device; and sharing the authentication information with the management device, and starting managing the network using the authentication information as the alternative management device when determining that the management device cannot communicate in the network.

A third aspect of the present invention is a management device, including an authenticating unit configured to authenticate a target device; a management unit configured to form a network together with the target device authenticated by the authenticating unit, and manage the network by delivering a session key for use in communication in the network to the authenticated target device; a suitability determining unit configured to determine whether or not to permit the device authenticated by the authenticating unit, to be an alternative management device which manages the network in replace of the management device, when communication is impossible in the network; and an authentication information processing unit configured to share the authentication information which is information about the authenticated target device, when the device was permitted to be the alternative management device.

Advantageous Effect of Invention

According to the present invention, it is possible to provide a communication system, a communication method, and a management device for increasing the stability of a network system by allowing a device other than a management device to manage the network in replace of the management device.

DESCRIPTION OF EXEMPLARY EMBODIMENTS

Figure 1:
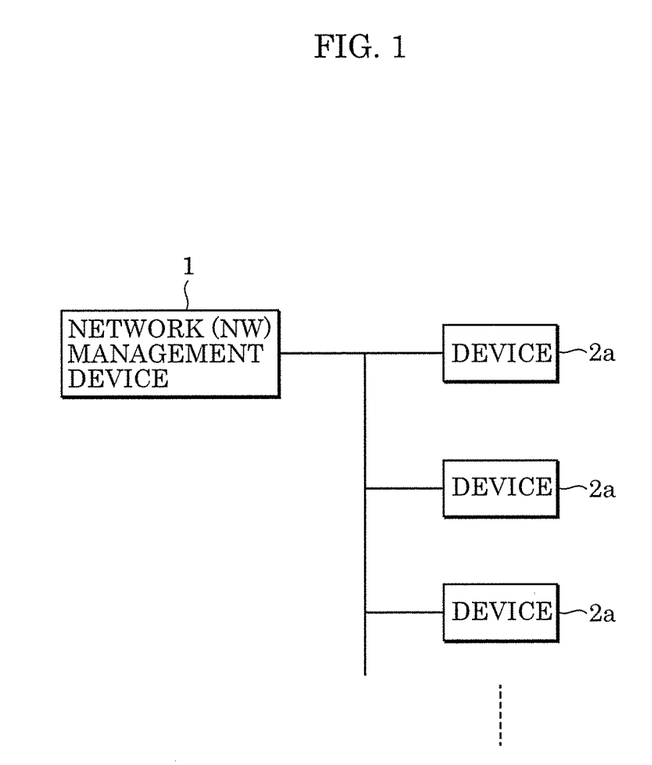
FIG. 1 is a schematic block diagram for illustrating a basic configuration of a communication system according to an embodiment of the present invention.

Next, an embodiment of the present invention is described with reference to the drawings. In the following descriptions of the drawings, the same or similar parts are assigned with the same or similar reference signs, and overlapping descriptions are not repeated.
Communication System As illustrated in FIG. 1, the communication system according to the embodiment of the present invention includes: network (NW) management device 1; and a plurality of devices 2a to 2c communicatively connected to NW management device 1. NW management device 1 and devices 2a to 2c form the network by authenticating each other, and perform encryption communication in the network. The network formed by NW management device 1 and devices 2a to 2c may be either a wired or wireless one.

NW management device 1 is, for example, a controller in a home energy management system (HEMS) which manages the amount of electricity used by devices 2a to 2c, the amount of electricity which has been generated excessively, and the like. In this case, devices 2a to 2c are respectively configured with power source devices such as an air conditioner, a refrigerator, a household electrical appliance such as a luminaire, a solar battery, a storage battery, etc. Other than that, the plurality of devices 2a to 2c may be respectively configured with a smart meter, an electric vehicle (EV), a plug-in-hybrid car (PHV), a water heater, etc.

Figure 2:
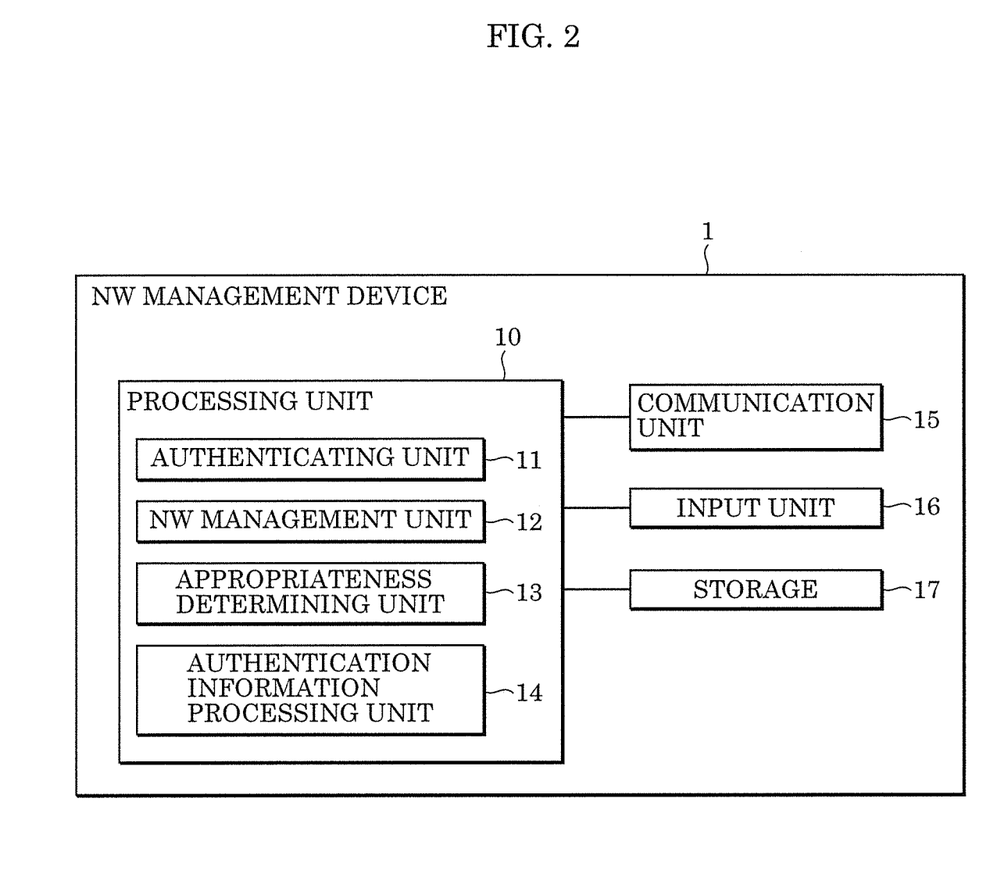
FIG. 2 is a block diagram for illustrating a basic configuration of a network (NW) management device included in the communication system according to the embodiment of the present invention.

As illustrated in FIG. 2, NW management device 1 includes: processing unit 10; communication unit 15 which communicates with the other devices under control by processing unit 10; input unit 16 which receives a user operation; and storage 17 which stores various kinds of information. Communication unit 15 may perform wireless communication or wired communication. For example, input unit 16 is configured with an input device such as push buttons and the like, and allows signals according to user operations to be input to processing unit 10. Storage 17 is configured with, for example, a storage device such as a semiconductor memory.

Processing unit 10 includes, as logical structures, the following; authentication processing unit 11; NW management unit 12; suitability determining unit 13; and authentication processing unit 14. Processing unit 10 is configured with, for example, operation processing device such as a microcomputer. Processing unit 10 includes a storage device which stores a program or each data.

Authentication processing unit 11 authenticates devices 2a to 2c which are target devices using electronic certificates stored in storage 17 via communication unit 15, and devices 2a to 2c authenticate authentication processing unit 11 via communication unit 15. Authentication processing unit 11 shares authentication keys different for respective devices 2a to 2c with devices 2a to 2c. The respective shared authentication keys are stored in storage 17. NW management unit 12 manages the network by delivering a session key for use in encryption communication in the network, to each of the target devices for which mutual authentication by authenticating unit 11 has been performed successfully. In addition, NW management unit 12 manages the network by periodically checking whether each of devices 2a to 2c holds an authentication key, and updating the session key when confirming that the authentication key is held.

Based on the attribute information obtained from devices 2a to 2c, suitability determining unit 13 determines whether or not to permit each of devices 2a to 2c to be an alternative management device which manages the network in replace of NW management device 1 if NW management device 1 cannot communicate in the network.

Authentication information processing unit 14 stores, in storage 17, authentication information which is information about devices 2a to 2c for which mutual authentication by authenticating unit 11 has been performed successfully so far. Authentication information is stored for each of devices 2a to 2c. The authentication information includes identifier (ID) for identifying a corresponding one of devices 2a to 2c, a communication address, an authentication key, a session expiration date, control history, etc.

Figure 3:
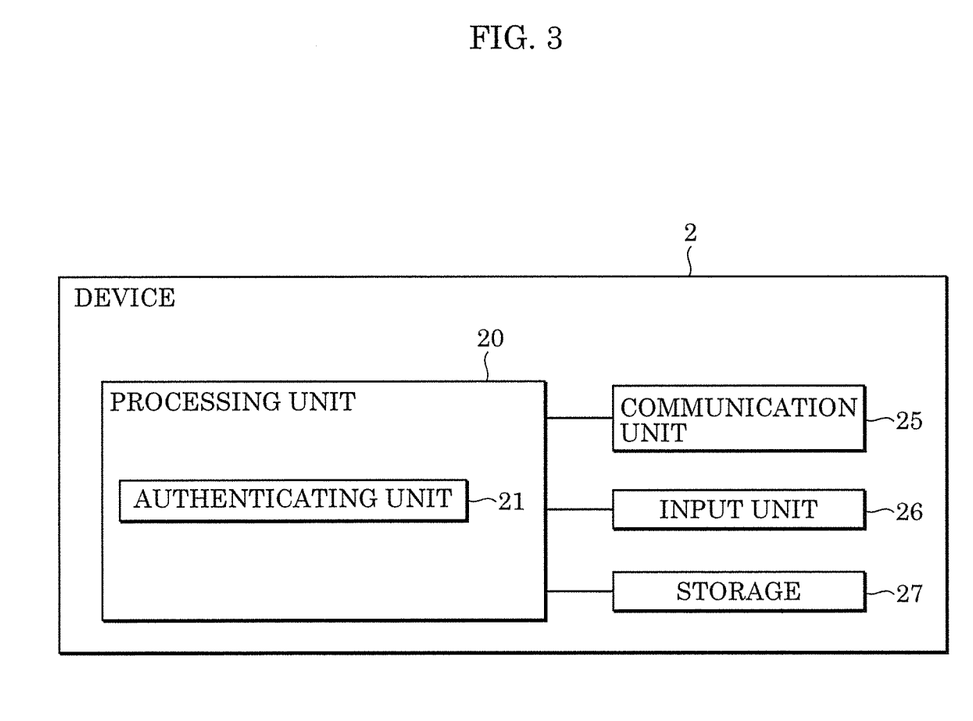
FIG. 3 is a block diagram for illustrating a basic configuration of a device included in the communication system according to the embodiment of the present invention.

As illustrated in FIG. 3, each of devices 2a to 2c (hereinafter, also referred to simply as "devices 2" when they are collectively called), includes: processing unit 20; communication unit 25 for communicating with the other devices under control by processing unit 20; input unit 26 for receiving a user operation, and storage 27. Processing unit 20 is configured with, for example, operation processing device such as a microcomputer. Processing unit 20 includes a storage device which stores a program or each data.

Communication unit 25 may perform wireless communication or wired communication. For example, input unit 26 is configured with an input device such as push buttons and the like, and allows signals according to user operations to be input to processing unit 20. Storage 27 is a storage device which stores various kinds of information such as electronic certificates, etc.

Processing unit 20 includes authenticating unit 21 as a logical structure. Authenticating unit 21 and NW management device 1 which manages the network authenticate each other using electronic certificates stored in storage 27 via communication unit 25, and share an authentication key. The shared authentication key is stored in storage 27.

Among devices 2, device 2a for example has a network management function equivalent to that of NW management device 1. In other words, the communication system according to the embodiment of the present invention has two controllers when forming the HEMS. In the communication system according to the embodiment of the present invention, normally, NW management device 1 manages the network, and device 2a stops an operation regarding the management of the network.

Figure 4:
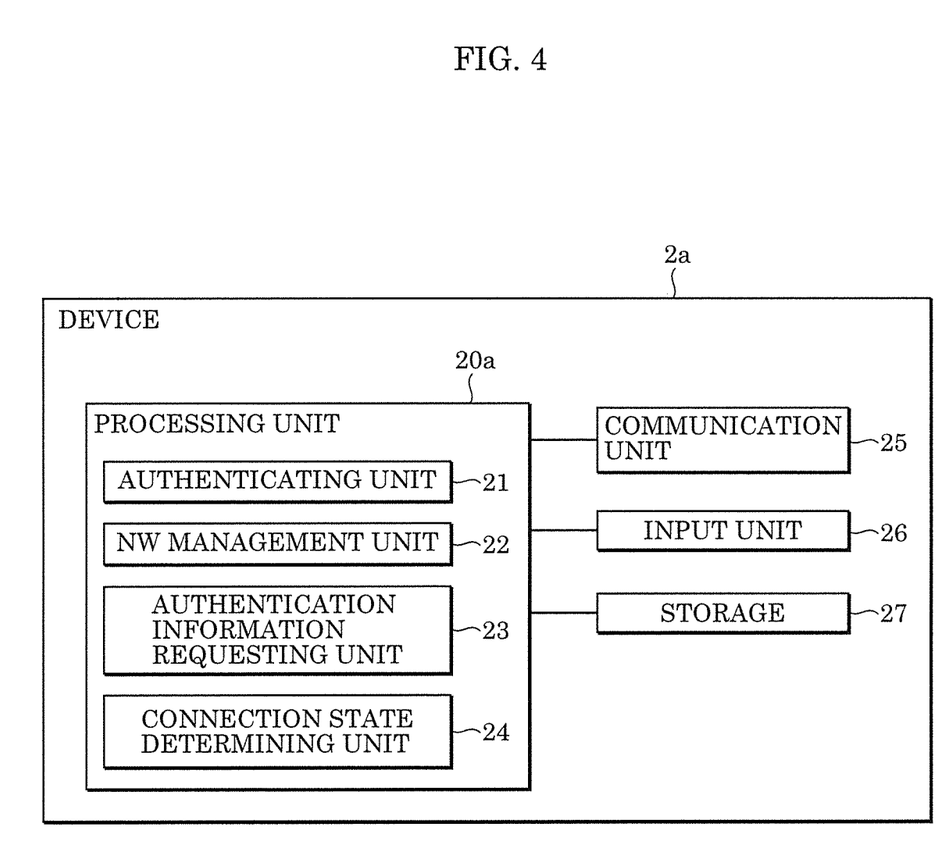
FIG. 4 is a block diagram for illustrating a basic configuration of a device having a network management function and included in the communication system according to the embodiment of the present invention.

As illustrated in FIG. 4, device 2a includes processing unit 20a which includes, as logical structures, the following: authenticating unit 21; NW management unit 22; authentication information requesting unit 23; and connection state determining unit 24. NW management unit 22 has a function equivalent to that of NW management unit 12, and stops an operation in normal time.

After the mutual authentication between device 2a and NW management device 1 was performed successfully, authentication information requesting unit 23 transmits an authentication information sharing request, which is a message for requesting the sharing of the authentication information, to NW management device 1 via communication unit 25.

Connection state determining unit 24 determines whether or not NW management device 1 can communicate in the network. Connection state determining unit 24 determines whether or not NW management device 1 can communicate based on, for example, whether or not communication unit 25 received a communication frame which is transmitted periodically from NW management device 1.

Operations Performed by Communication System

Figure 5:
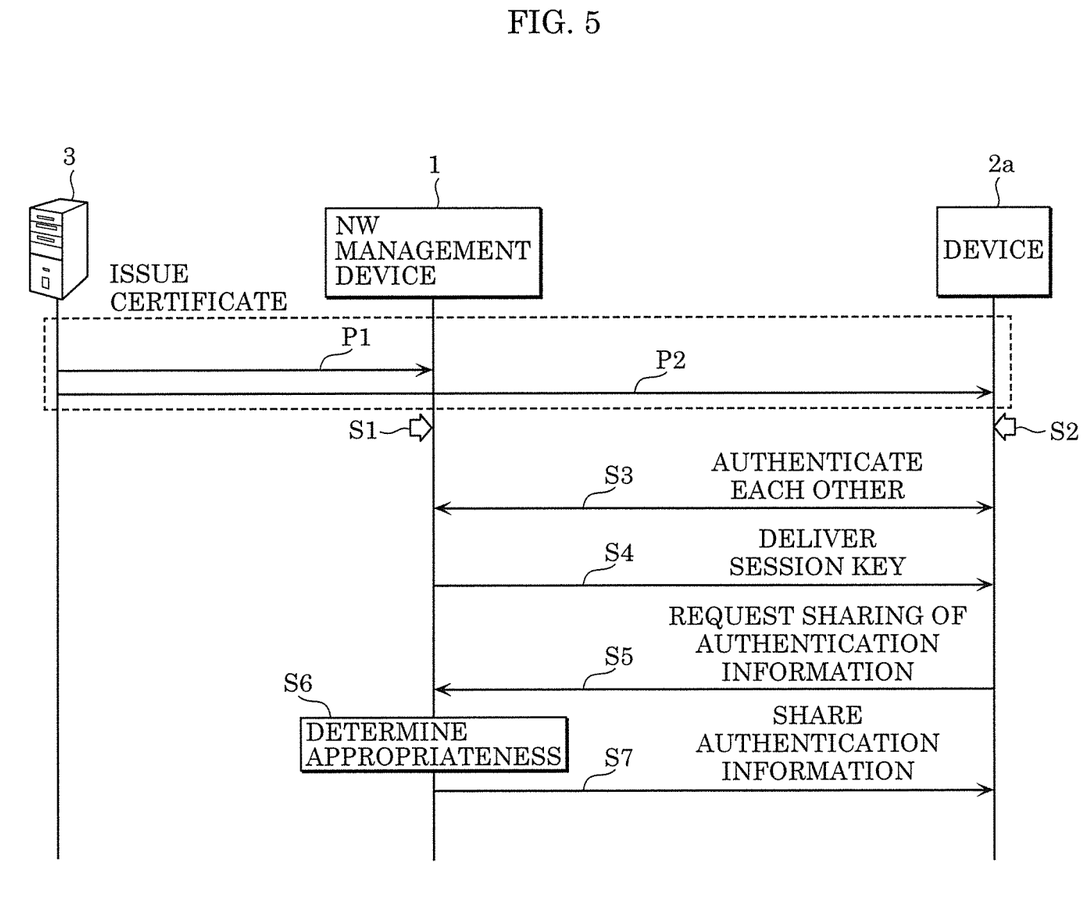
FIG. 5 is a sequence diagram for illustrating an operation example in the communication system according to the embodiment of the present invention.

Hereinafter, operations performed by a communication system according to an embodiment of the present invention are described with reference to FIG. 5 to FIG. 9. Certificate Authority 3 in FIG. 5 issues electronic certificates each assigned with a digital signature to respective NW management device 1 and device 2a in Steps P1 and P2 in advance. The electronic certificates are each issued together with a public key held by certificate authority 3. Steps P1 and P2 are performed when, for example, NW management device 1 and device 2a are delivered from a factory. The electronic certificate issued for NW management device 1 and the electronic certificate issued for device 2a are stored in storage 17 and storage 27, respectively.

First, with reference to the sequence diagram of FIG. 5, descriptions are given of operations performed by a communication system when device 2a enters the network managed by NW management device 1.

In Step S1, authenticating unit 11 of NW management device 1 transitions to a setting mode for performing mutual authentication with device 2a which is a target device, according to a user operation onto input unit 16. In Step S2, authenticating unit 21 of device 2a transitions to a setting mode for performing mutual authentication with NW management device 1, according to a user operation onto input unit 26.

In Step S3, NW management device 1 and device 2a authenticate each other using the respective electronic certificates thereof. Authenticating unit 11 and authenticating unit 21 mutually transmit the electronic certificates stored in storage 17 and storage 27, mutually check the digital signatures of the received electronic certificates, and verify that the electronic certificates are certificates issued by certificate authority 3. Here, the authentication fails when the content of any of the electronic certificates does not satisfy a predetermined condition. Furthermore, each of authenticating unit 11 and authenticating unit 21 checks whether the authentication target device holds a secret key corresponding to the received electronic certificate. In this way, each of authenticating unit 11 and authenticating unit 21 can confirm that the authentication target device holds a pair of the authorized secret key and a public key certificate issued by certificate authority 3, and perform mutual authentication.

When the mutual authentication was performed successfully in Step S3, NW management unit 12 shares, in Step S4, the authentication key with device 2a through, for example, key exchange using public key encryption. Furthermore, NW management device 1 and device 2a share a session key (a shared secret key) for use in the subsequent encryption communication. For example, NW management device 1 encrypts the session key using the shared authentication key, and delivers the encrypted session key. Here, a method for delivering the session key is not limited to the above method.

Furthermore, when the mutual authentication was performed successfully in Step S3, authentication information processing unit 14 adds, in Step S4, information about device 2a for which the mutual authentication was successfully performed, so as to update the authentication information stored in storage 17. Authentication information processing unit 14 adds, to the authentication information, for example, ID of device 2a, a communication address, an authentication key, control history, etc., so as to update the authentication information.

In Step S5, authentication information requesting unit 23 transmits, to NW management device 1, an authentication information sharing request for requesting NW management device 1 to share the authentication information. The authentication information sharing request includes, for example, attribute information of device 2a included in the electronic certificate stored in storage 27. Attribute information includes, for example, the type of device 2a (a desk top type, a PC, a mobile terminal, or the like), the number of target devices which can be managed by device 2a (the maximum number of devices to be managed), the version of a supported standard, a manufacturing time of year, etc.

In Step S6, in response to the authentication information sharing request, suitability determining unit 13 determines whether or not to permit device 2a to be an alternative management device which manages the network in replace of NW management device 1, when NW management device 1 cannot communicate in the network. Suitability determining unit 13 determines whether or not to permit device 2a to be an alternative management device, based on the attribute information of device 2a included in the authentication information sharing request. For example, suitability determining unit 13 may be of a desk top type, and may permit device 2a which can manage a maximum number of devices equal to or larger than the number of devices 2 currently present in the network, to be an alternative management device.

When suitability determining unit 13 permits device 2a to be the alternative management device, in Step S7, authentication information processing unit 14 transmits authentication information to be stored in storage 17 to device 2a so as to share the authentication information with device 2a. When transmitting the authentication information, suitability determining unit 13 prevents the other devices in the network from getting the authentication information by, for example, encrypting the authentication information using an authentication key shared between NW management device 1 and device 2a. Device 2a stores the shared authentication information in storage 27.

Figure 6:
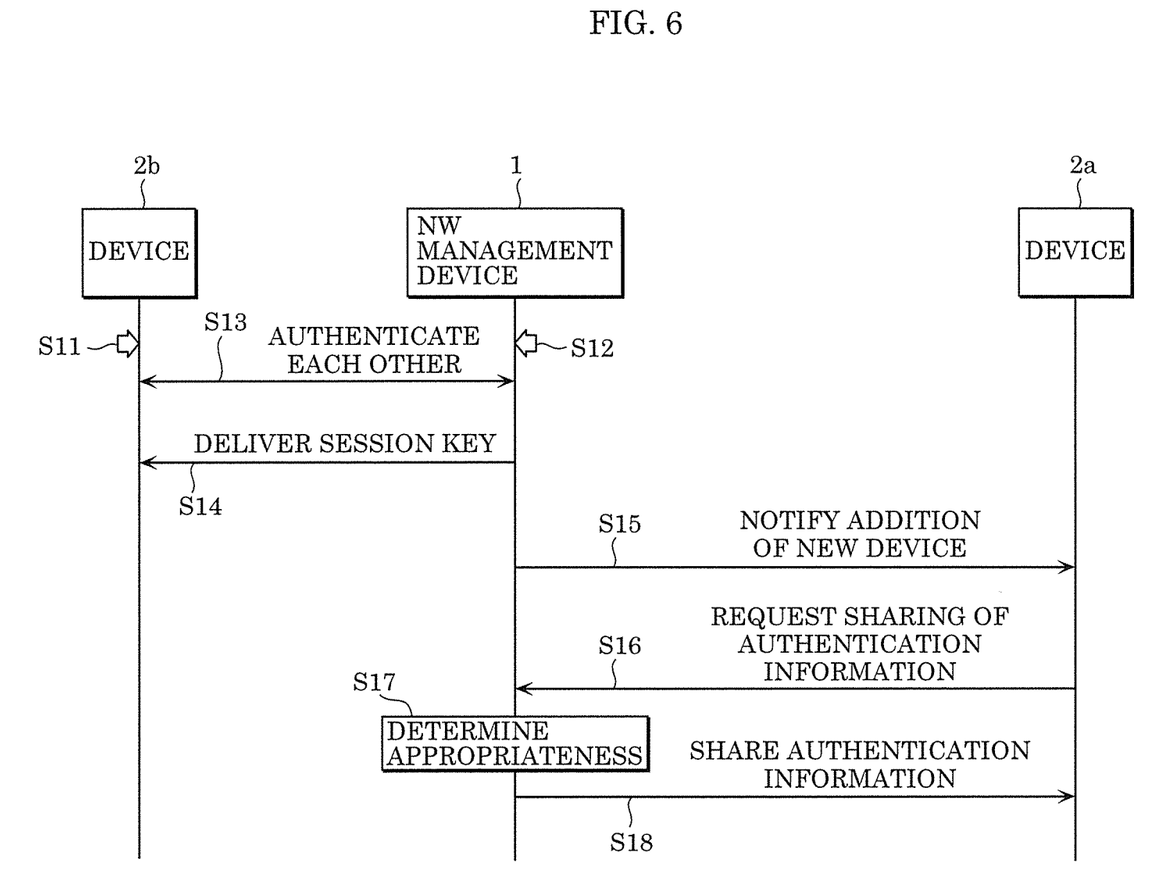
FIG. 6 is a sequence diagram for illustrating an operation example in the communication system according to the embodiment of the present invention.

Next, with reference to the sequence diagram of FIG. 6, descriptions are given of operations performed by the communication system in the case where new device 2b was added to the network after device 2a after device 2a was permitted to be the alternative management device, and device 2a synchronizes authentication information with NW management device 1.

In Steps S11 to S14, NW management device 1 and device 2b perform mutual authentication, and share a session key. When the mutual authentication was performed successfully in Step S13, authentication information processing unit 14 adds information about device 2b for which the mutual authentication was successfully performed, so as to update the authentication information stored in storage 17. The descriptions of operations in Steps S11 to S14 are substantially similar to and overlap with the descriptions of Steps S1 to S4 in FIG. 5, and thus are not repeated.

In Step S15, authentication information processing unit 14 transmits, to device 2a which is the alternative management device, new device addition notification which is a message that NW management device 1 notifies that new device 2b was added in the network managed by NW management device 1.

In Step S16, authentication information requesting unit 23 transmits authentication information sharing request to NW management device 1, in response to the new device addition notification transmitted from NW management device 1.

In Step S17, suitability determining unit 13 determines whether or not to permit device 2a to be the alternative management device, based on the attribute information of device 2a.

When suitability determining unit 13 permits device 2a to be the alternative management device, in Step S18, authentication information processing unit 14 transmits authentication information to be stored in storage 17 to device 2a so as to share the authentication information with device 2a. In this way, device 2a which is the alternative management device can share the latest authentication information in which new device 2b was added with NW management device 1.

Figure 7:
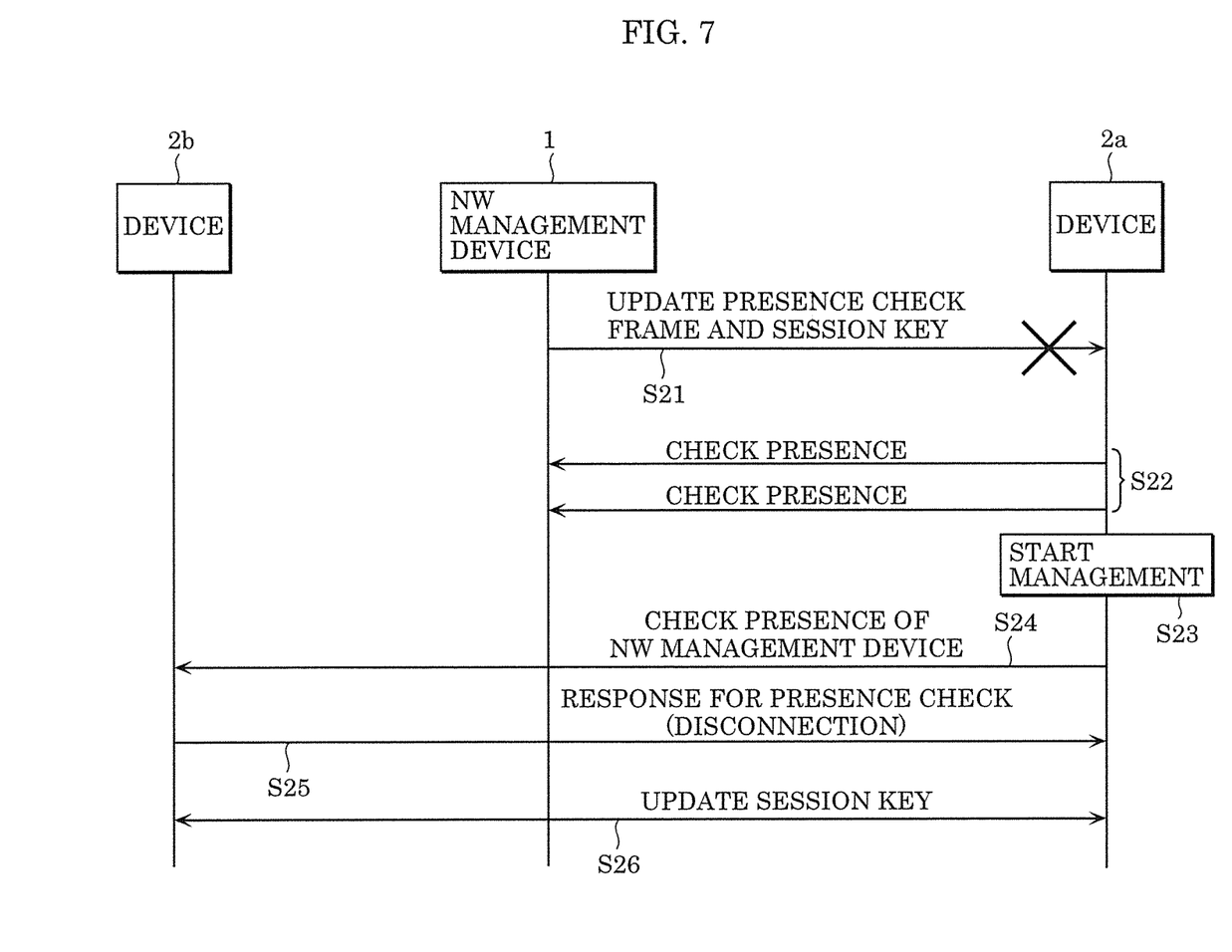
FIG. 7 is a sequence diagram for illustrating an operation example in the communication system according to the embodiment of the present invention.

Next, with reference to the sequence diagram of FIG. 7, descriptions are given of operations performed by the communication system after device 2a was permitted to be the alternative management device in the case where device 2a determines a connection state of NW management device 1, and starts managing the network.

In Step S21, NW management unit 12 periodically transmits a predetermined communication frame to devices 2 in the network. For example, NW management device 1 periodically transmits a presence check frame (such as a beacon frame), to devices 2 in the network or periodically updates session keys for devices 2.

In Step S22, in response to connection state determining unit 24 having failed to receive any communication frame that should have been periodically transmitted from NW management device 1, connection state determining unit 24 transmits a presence check message for checking an operation state of NW management device 1 to NW management device 1 plural times at intervals. When the operation state and the state of a communication circuit are normal, NW management device 1 transmits a response message indicating that NW management device 1 and the communication circuit are operating normally, in response to the presence check message. By transmitting the presence check message plural times at intervals in Step S22, connection state determining unit 24 can reduce the possibility of erroneous determination due to a temporary trouble of the communication circuit, or the like.

In Step S23, as a result that NW management device 1 does not respond to the presence check message, connection state determining unit 24 determines that NW management device 1 cannot communicate due to a breakdown or the like. In response to connection state determining unit 24 determining that NW management device 1 cannot communicate, NW management unit 22 of device 2a starts managing the network in replace of NW management device 1.

In Step S24, connection state determining unit 24 transmits, to device 2b, a presence check request which is a message for asking the other devices 2 in the network about the operating state of NW management device 1.

In Step S25, in response to the presence check request, device 2b transmits, to device 2a, a presence confirmation response which is a message indicating the operating state of NW management device 1, depending on the presence/absence of communication with NW management device 1. Device 2a can determine whether or not the whole network can be used by transmitting the presence check request to device 2b.

In Step S26, NW management unit 22 of device 2a performs authentication by a shared authentication key with the other devices 2 in the network, using authentication information shared in advance with NW management device 1, delivers a new session key when the authentication is performed successfully, and updates a session key. The session key is updated before the session expiration date expires.

As described above, device 2a determines whether or not NW management device 1 can communicate, by asking the other devices 2 authenticated by NW management device 1 whether NW management device 1 can communicate. In this way, device 2a can reduce the possibility of erroneous determination on the operating state of NW management device 1.

Figure 8:
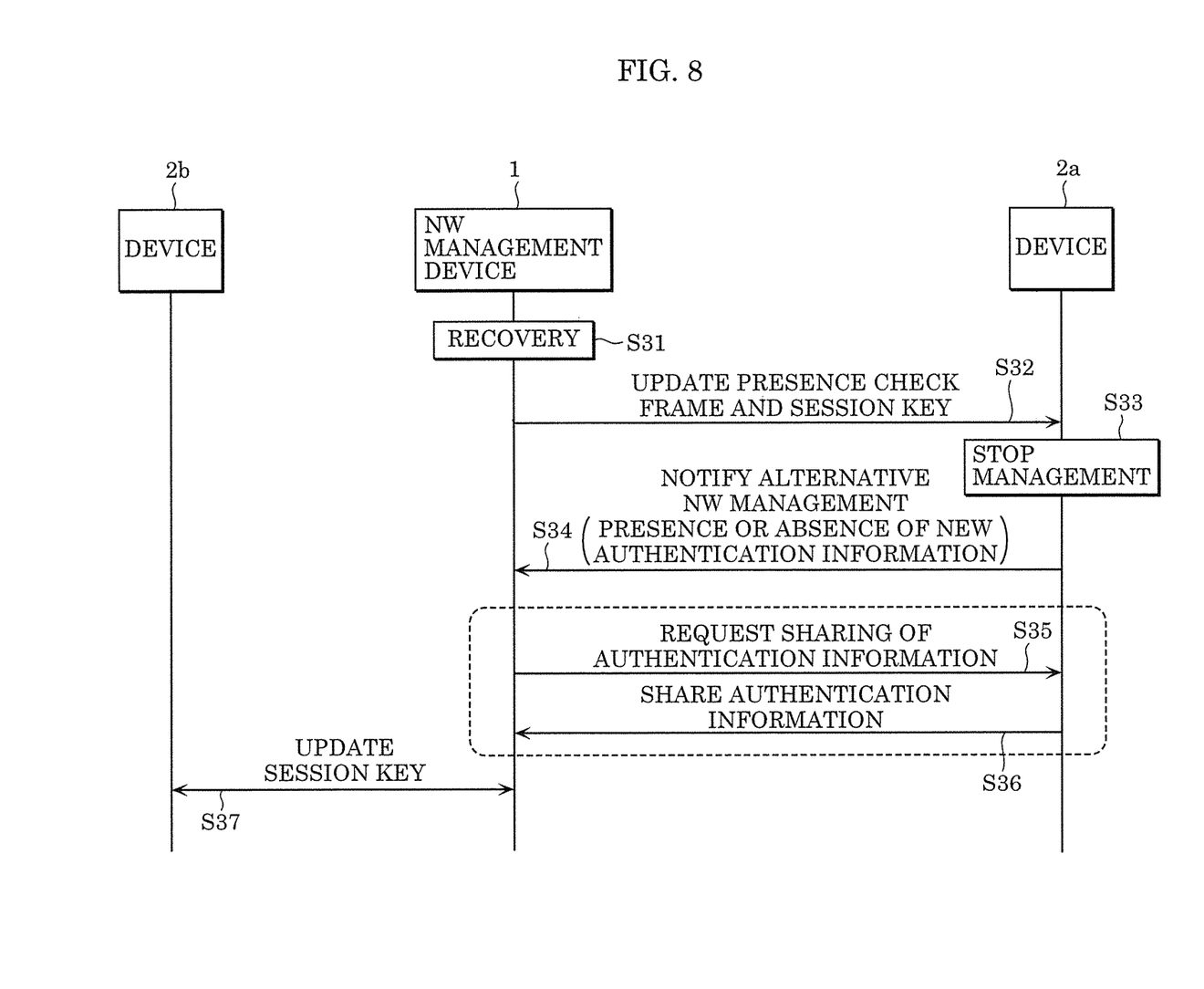
FIG. 8 is a sequence diagram for illustrating an operation example in the communication system according to the embodiment of the present invention.

Next, with reference to the sequence diagram of FIG. 8, descriptions are given of operations performed by the communication system at the time when NW management device 1 restarts managing the network in the case where NW management device 1 recovered after device 2a started managing the network.

In Step S31, NW management device 1 recovers from a state in which NW management device 1 was not able to communicate in the network for some reason to a normal state.

In Step S32, NW management unit 1 periodically transmits a predetermined communication frame to devices 2 in the network. For example, NW management device 1 periodically transmits a presence check frame (such as a beacon frame) to devices 2 in the network, or periodically updates a session key for devices 2.

In Step S33, in response to NW management device 1 having restarted periodically transmitting a predetermined frame, connection state determining unit 24 determines that NW management device 1 recovered and thus can communicate. NW management unit 22 of device 2a stops managing the network in replace of NW management device 1, as a result that connection state determining unit 24 determined that NW management device 1 can communicate.

In Step S34, NW management unit 22 transmits, to NW management device 1, an alternative NW management notification which is a message indicating whether or not authentication information is updated during which device 2a was managing the network.

When authentication information was updated while device 2a was managing the network, NW management device 1 and device 2a share the latest authentication information in Steps S35 and S36. For example, in Step S35, authentication information processing unit 14 of NW management device 1 requests device 2a for the latest authentication information. Then, in Step S36, NW management unit 22 of device 2a transmits, as a response, the authentication information stored in storage 27. Authentication information processing unit 14 stores the latest authentication information to storage 17. When no update of authentication information was performed while device 2a was managing the network, processes in Steps S35 and S36 are not required.

In Step S37, NW management device 1 restarts managing the network by updating a session key of device 2 in the network using the authentication information stored in storage unit 17.

As described above, when NW management device 1 recovered, device 2a which is the alternative management device stops managing the network, and NW management device 1 restarts managing the network. In this way, it is possible to manage the network by the optimum management functions anytime.

Figure 9:
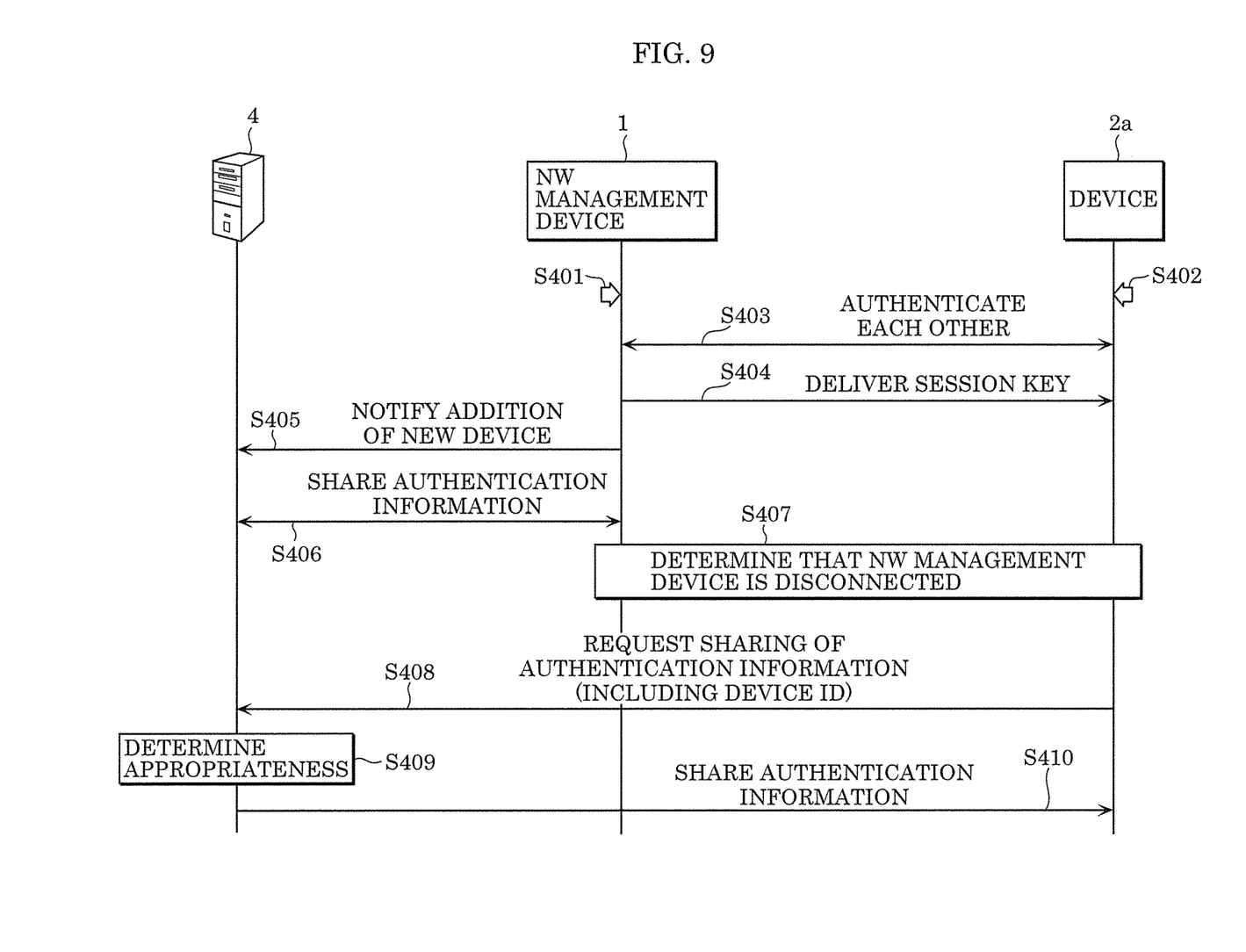
FIG. 9 is a sequence diagram for illustrating an operation example in the communication system according to the embodiment of the present invention.

Next, with reference to the sequence diagram of FIG. 9, descriptions are given of operations performed by the communication system in the case where NW management device 1 and device 2a share authentication information via external server 4.

In Steps S401 to S404, NW management device 1 and device 2a perform mutual authentication, and share a session key. The descriptions of operations in Steps S401 to S404 are substantially similar to and overlap with the descriptions of Steps S1 to S4 in FIG. 5, and thus are not repeated.

When the mutual authentication was performed successfully in Step S403, in Step S405, authentication information processing unit 14 transmits, to external server 4, a new device addition notification which is a message for notifying that new device 2a entered the network.

In Step S406, NW management device 1 and external server 4 share authentication information stored in storage 17. In Step S407, connection state determining unit 24 of device 2a determines that NW management device 1 cannot communicate in the network.

In response to connection state determining unit 24 having determined that NW management device 1 was not able to communicate, in Step S408, authentication information requesting unit 23 of device 2a transmits, to external server 4, an authentication information sharing request for requesting external server 4 to share the authentication information.

In response to the authentication information sharing request, in Step S409, external server 4 determines whether or not to permit device 2a to be an alternative management device, based on the attribute information of device 2a included in the authentication information sharing request. External server 4 may determine whether to permit device 2a to be the alternative management device in the same manner as the determination made by suitability determining unit 13.

When device 2a was permitted to be the alternative management device, in Step S410, external server 4 transmits the authentication information to be stored to device 2a so as to share the authentication information with device 2a. Device 2a stores the shared authentication information in storage 27.

As described above, NW management device 1 and device 2a share authentication information via external server 4, thereby reducing a communication load (traffic) in the network. When external server 4 received the transmitted authentication information sharing request in Step S409 and recognizes that NW management device 1 is normally operating, it is to be noted that external server 4 may notify device 2a of the fact. In this way, it is possible to reduce the possibility that an erroneous determination is made by connection state determining unit 24.

In the communication system according to this embodiment of the present invention, NW management device 1 and device 2a having a network management function can share authentication information, and device 2a can manage the network in replace of NW management device 1 when NW management device 1 cannot communicate. Thus, in the communication system according to this embodiment of the present invention, even when NW management device 1 cannot communicate due to a breakdown or the like, device 2a which is the alternative management device can perform authentication, update of a session key, or the like, thereby increasing the stability of the system.

OTHER EMBODIMENTS

The present invention has been described above based on the embodiment, the descriptions and drawings which constitute the present disclosure should not be interpreted as limiting the present invention. A person skilled in the art will appreciate various kinds of alternative embodiments, examples, and application techniques clearly from the present disclosure.

For example, in the embodiment described above, suitability determining unit 13 may set priority ranks to the plurality of devices 2 when there are several devices 2 which can be an alternative management device. In this way, when NW management device 1 cannot communicate, devices 2 having higher priority ranks can manage the network by turns in replace of NW management device 1.

In addition, in the embodiment described above, authentication information processing unit 14 may add the authentication information to be stored in storage 17 to the new device addition notification in Steps S15 and S405, and transmit the notification. In this way, it is possible to skip a process for sharing the authentication information immediately after each of Step S16 and Step S406.

In addition, as a matter of course, the present invention includes various kinds of embodiments etc. obtainable by mutually applying the above-described configurations and operations. Accordingly, the technical scope of the present invention should be defined based only on the invention-specifying matter according to the scope of the claims which are appropriate based on the above descriptions.

The invention claimed is:

1. A communication system, comprising:
a circuit including:
    a management controller (i) connected to an authenticated target device to form a network, and (ii) manages the network by delivering a session key for use in communication in the network to the authenticated target device; and
    a device authenticated by the management controller,
wherein the management controller;
    determines whether or not to permit the device to be an alternative management controller which manages the network in replace of the management controller when the management controller cannot communicate in the network;
    shares, with the device, authentication information about the authenticated target device, when permitting the device to be the alternative management controller; and
    the device shares the authentication information with the management controller, and, as the alternative management controller, starts managing the network using the authentication information by delivering the session key to the authenticated target device,
wherein the device determines whether or not the management controller can communicate based on a communication frame which is periodically transmitted from the management controller.

2. The communication system according to claim 1,
wherein the management controller determines whether or not to permit the device to be the alternative management controller, based on attribute information of the device obtained from the device.

3. A communication system, comprising:
a circuit including:
   a management controller (i) connected to an authenticated target device to form a network, and (ii) manages the network by delivering a session key for use in communication in the network to the authenticated target device; and
   a device authenticated by the management controller,
   wherein the management controller;
   determines whether or not to permit the device to be an alternative management controller which manages the network in replace of the management controller when the management controller cannot communicate in the network;
   shares, with the device, authentication information about the authenticated target device, when permitting the device to be the alternative management controller; and
   the device shares the authentication information with the management controller, and, as the alternative management controller, starts managing the network using the authentication information by delivering the session key to the authenticated target device,
wherein the device determines whether or not the management controller can communicate, by asking another target device which has been authenticated by the management controller whether or not the management controller can communicate.

4. A communication system, comprising:
a circuit including:
   a management controller (i) connected to an authenticated target device to form a network, and (ii) manages the network by delivering a session key for use in communication in the network to the authenticated target device; and
   a device authenticated by the management controller,
   wherein the management controller;
   determines whether or not to permit the device to be an alternative management controller which manages the network in replace of the management controller when the management controller cannot communicate in the network;
   shares, with the device, authentication information about the authenticated target device, when permitting the device to be the alternative management controller; and
   the device shares the authentication information with the management controller, and, as the alternative management controller, starts managing the network using the authentication information by delivering the session key to the authenticated target device,
wherein the management controller shares the authentication information with the device each time a new target device is added to the network.

5. A communication system, comprising:
a circuit including:
   a management controller (i) connected to an authenticated target device to form a network, and (ii) manages the network by delivering a session key for use in communication in the network to the authenticated target device; and
   a device authenticated by the management controller,
   wherein the management controller;
   determines whether or not to permit the device to be an alternative management controller which manages the network in replace of the management controller when the management controller cannot communicate in the network;
   shares, with the device, authentication information about the authenticated target device, when permitting the device to be the alternative management controller; and
   the device shares the authentication information with the management controller, and, as the alternative management controller, starts managing the network using the authentication information by delivering the session key to the authenticated target device,
wherein the management controller periodically shares the authentication information with the device.

6. A communication system, comprising:
a circuit including:
   a management controller (i) connected to an authenticated target device to form a network, and (ii) manages the network by delivering a session key for use in communication in the network to the authenticated target device; and
   a device authenticated by the management controller,
   wherein the management controller;
   determines whether or not to permit the device to be an alternative management controller which manages the network in replace of the management controller when the management controller cannot communicate in the network;
   shares, with the device, authentication information about the authenticated target device, when permitting the device to be the alternative management controller; and
   the device shares the authentication information with the management controller, and, as the alternative management controller, starts managing the network using the authentication information by delivering the session key to the authenticated target device,
wherein the device stops managing the network in response to the management controller recovering from communication failure in the network after the device started managing the network.

7. The communication system according to claim 6,
wherein, in response to the management controller recovering from the communication failure in the network in the case where the device updated the authentication information while managing the network, the device shares the authentication information with the management controller.

8. The communication system according to claim 1, further comprising
an external server communicatively connected to the management controller and the device,
wherein the management controller and the device share the authentication information via the external server.

9. A communication method performed in a communication system including: a management device which (i) forms a network together with an authenticated target device, and (ii) manages the network by delivering a session key for use in communication in the network to the authenticated target device; and a device authenticated by the management device, the communication method comprising:
   determining whether or not to permit the device to be an alternative management device which manages the network in replace of the management device when the management device cannot communicate in the network, the determining being performed by the management device;

sharing, with the device, authentication information about the authenticated target device, when permitting the device to be the alternative management device, the sharing being performed by the management device; and sharing the authentication information with the management device, and, the device acting as the alternative management device, starting managing the network using the authentication information by delivering the session key to the authenticated target device, wherein the device determines whether or not the management device can communicate based on a communication frame which is periodically transmitted from the management device.

10. A management device, comprising a circuit configured to authenticate a target device;

the management device connected to the authenticated target device to form a network, the circuit further configured to manage the network by delivering a session key for use in communication in the network to the authenticated target device;

the circuit further configured to determine whether or not to permit the authenticated target device to be an alternative management device which manages the network in replace of the management device, when the management device cannot communicate in the network; and the circuit further configured to share the authentication information which is information about the authenticated target device, when the authenticated target device was permitted to be the alternative management device, wherein the circuit determines whether or not the management device can communicate based on a communication frame which is periodically transmitted from the management device.

* * * * *